Sept. 7, 1965  S. M. BARBER  3,204,832
MATERIAL DISPENSING APPARATUS
Filed Aug. 24, 1962  3 Sheets-Sheet 1

INVENTOR.
S. MORGAN BARBER

BY Fulwider, Mattingly
& Huntley
ATTORNEYS

Sept. 7, 1965    S. M. BARBER    3,204,832
MATERIAL DISPENSING APPARATUS
Filed Aug. 24, 1962    3 Sheets-Sheet 2

INVENTOR.
S. MORGAN BARBER
BY *Fulwider, Mattingly*
*& Huntley*
ATTORNEYS

Sept. 7, 1965  S. M. BARBER  3,204,832
MATERIAL DISPENSING APPARATUS
Filed Aug. 24, 1962  3 Sheets-Sheet 3

INVENTOR.
S. MORGAN BARBER
BY Fulwider, Mattingly
& Huntley
ATTORNEYS

United States Patent Office 3,204,832
Patented Sept. 7, 1965

3,204,832
MATERIAL DISPENSING APPARATUS
S. Morgan Barber, 400 S. Occidental, Los Angeles, Calif.
Filed Aug. 24, 1962, Ser. No. 220,122
22 Claims. (Cl. 222—196)

The present invention relates to material dispensing apparatus, and is a continuation-in-part of my application Serial Number 815,026, filed May 22, 1959, and now abandoned.

The dispensing of materials such as powdered coffee, powdered tea, sugar, cream, powdered chocolate, and the like, and particularly the highly hygroscopic materials such as powdered tea and coffee, has not heretofore been completely successful. Entry of undesirable moisture clogs the operating portions of such apparatus, and it has been a serious problem to keep the hygroscopic materials dry enough to permit them to be handled by the apparatus. For example, powdered tea and coffee are usually available on the market in standard containers or jars, and it is common practice to empty the contents of such jars into a reservoir in the dispensers of the prior art. During this transfer, moisture is invariably absorbed from the atmosphere and from unused material still present in the reservoir. Further, since the reservoir must be continuously reused, it has to be cleaned and washed, and the moisture remaining from the washing also passes to the new contents placed in the reservoir. Also, the path followed by the material during a dispensing operation was usually open to the atmosphere at some point, and additional moisture was absorbed. The resultant clogging of the dispensing apparatus interfered with the operation of the apparatus and spoiled its metering accuracy, and periodic disassembly and cleaning of the apparatus was necessary.

According to the present invention, a material dispensing apparatus is provided which is simple in construction, reliable in operation, and relatively inexpensive to manufacture. It is particularly useful for incorporation in machines used to automatically dispense hygroscopic powdered materials such as coffee, tea, soups, cream, and sugar in both commercial and home application. It is also useful in the dispensing of liquid materials, as will be hereinafter further described.

The apparatus of the present invention is adapted to accurately and repetitively dispense measured quantities of material without clogging, thereby maintaining the apparatus in productive use for extended periods of time. The apparatus is adapted to quickly accept standard sized jars or containers of material, using the container itself as a reservoir and thereby avoiding the necessity of having to transfer the contents of such containers to a reservoir in the apparatus. The usual material containers are transparent, so that use of such containers as the reservoir permits a quick visual check on the amount of material consumed.

The present material dispensing apparatus comprises a material receiver which includes, preferably, a downwardly tapering chamber terminating in a discharge passage. In one embodiment of the present invention the material receiver conveniently takes the form of a funnel which is adapted for engagement at its upper edge with the mouth or lip of a standard container for material. A threaded element separably secures the container and the funnel together so that the contents of the container are substantially sealed off from the atmosphere and are disposed to be discharged into the funnel.

The discharge passage forms a lower conduit or tubular extension depending from the funnel, and a reciprocating member, modulating element or valve is mounted for reciprocable movement for controlling, i.e. regulating or metering the flow of material which is dispensed through this discharge passage. The valve includes a valve stem which, during at least a portion of the reciprocable movement of the valve, is engageable with a springy or resilient member which is preferably horizontally disposed across the top of the funnel and adapted to be clamped in position between the funnel and the container. The resilient member, which may be a thin sheet metal diaphragm or the like, includes a plurality of openings so that when the valve stem engages the diaphragm, two primary results occur. The diaphragm is urged upwardly, and its tendency to assume its normal position then acts to bias the valve downwardly. In addition the movement of the diaphragm serves to agitate the material in the container and the funnel to facilitate its progress downwardly from the container and through the funnel.

The valve, in one embodiment, includes an enlarged end which acts to move the material in the discharge passage upwardly and downwardly with it, modulating the flow, and establishing a metered or regular flow of material through the passage. In another embodiment, the valve is disposed at the inlet end of the discharge passage. Thus the valve, in either embodiment, tends to even out and tends to make uniform the flow of material regardless of the varying weight or pressure head of the material in the funnel and container. In the dispensing of liquid materials this pulsating movement of the valve also tends to provide a uniform flow of the liquid material, apparently by reason of the regulation of the amount of air which flows upwardly through the discharge passage to replace the material dispensed.

In one embodiment, a funnel is disposed within the receiver. The outlet end of the funnel is vertically aligned with the vertical discharge passage, and, an opening is formed in the side of the receiver at a higher level than the outlet of the funnel for the ingress and egress of air to the space between the funnel and the receiver.

A vibrator mechanism such as a solenoid, or the like, is separably associated with the lower end of the depending conduit from the funnel, and is energizable to upwardly attract a lower ferrous portion, i.e., a solenoid core, of the valve to thereby move the valve upwardly and away from the outlet of the material receiver. Further, during operation, the solenoid acts to maintain the lower end of the valve in spaced relationship above the outlet so that material is permitted to be dispensed out of said outlet.

As the valve is moved upwardly by the solenoid or vibrator mechanism, a portion of the valve stem impinges against the resilient member herein shown as a diaphragm. Immediately thereafter the valve is urged downwardly by the restoring bias of the resilient member, and the solenoid then again acts to move the valve upwardly. This cycle of upward and downward movement is very rapid so that the resilient member shakes or agitates the material which substantially surrounds the same.

When the container, which carries the material to be dispensed, is placed in position upon the receiver, a certain amount of the material will fall naturally through the openings in the diaphragm, and the agitation of the diaphragm therefore serves to agitate and loosen the material so that it will fall downwardly through the diaphragm. That is, downward movement of the material will occur as a matter of course if the material is kept loose.

Thereafter, the material passes from the receiver into the downward passage, and it is modulated or metered out of the outlet by the reciprocable movement of the valve. Upon termination of the agitation of the valve, it is seated to stop the flow of material and prompts ingress of air. The material to be dispensed is thus substantially completely sealed off from moisture laden air during its progress from its container to the outlet passage of the apparatus.

The present invention also includes a sealed manifold disposed adjacent the outlet opening, the manifold preferably housing a heat source, and having an inlet port for air and an outlet port beneath the outlet opening for the discharge of warm air. The manifold also includes means for directing the warm air about the outlet opening and along the path which the material will follow when it falls downwardly from the outlet opening. Thus the material is bathed in a warm stream of downwardly moving air during its progress from the present apparatus to a mixing chamber or the like. The mixing chamber does not form a part of the present invention but conventionally is supplied with hot water which mixes with the material to produce, for example, hot tea or coffee. The downward flow of warm air prevents the flow of steam or moisture laden air from passing from the mixing chamber to the outlet opening.

In one embodiment of the present invention the solenoid coil constitutes a relatively fixed portion, and is adapted to removably accept the container with the receiver and valve attached thereto. That is, the container is disposed upon the solenoid in such a way that its position is maintained by gravity, and the container with the receiver and valve attached thereto may be easily removed from the association with the solenoid, thereby permitting a fresh container to be associated with the container and valve whenever desired.

The dispensing of material may be instantly initiated by energization of the solenoid coil or vibrator mechanism, and may be maintained for any pre-determined time, and thereafter instantly terminated.

Other objects, features and advantages of the present invention will be readily apparent to those skilled in the art from the following specification and appended drawings wherein preferred forms of the invention are illustrated, and in which.

Figure 1:
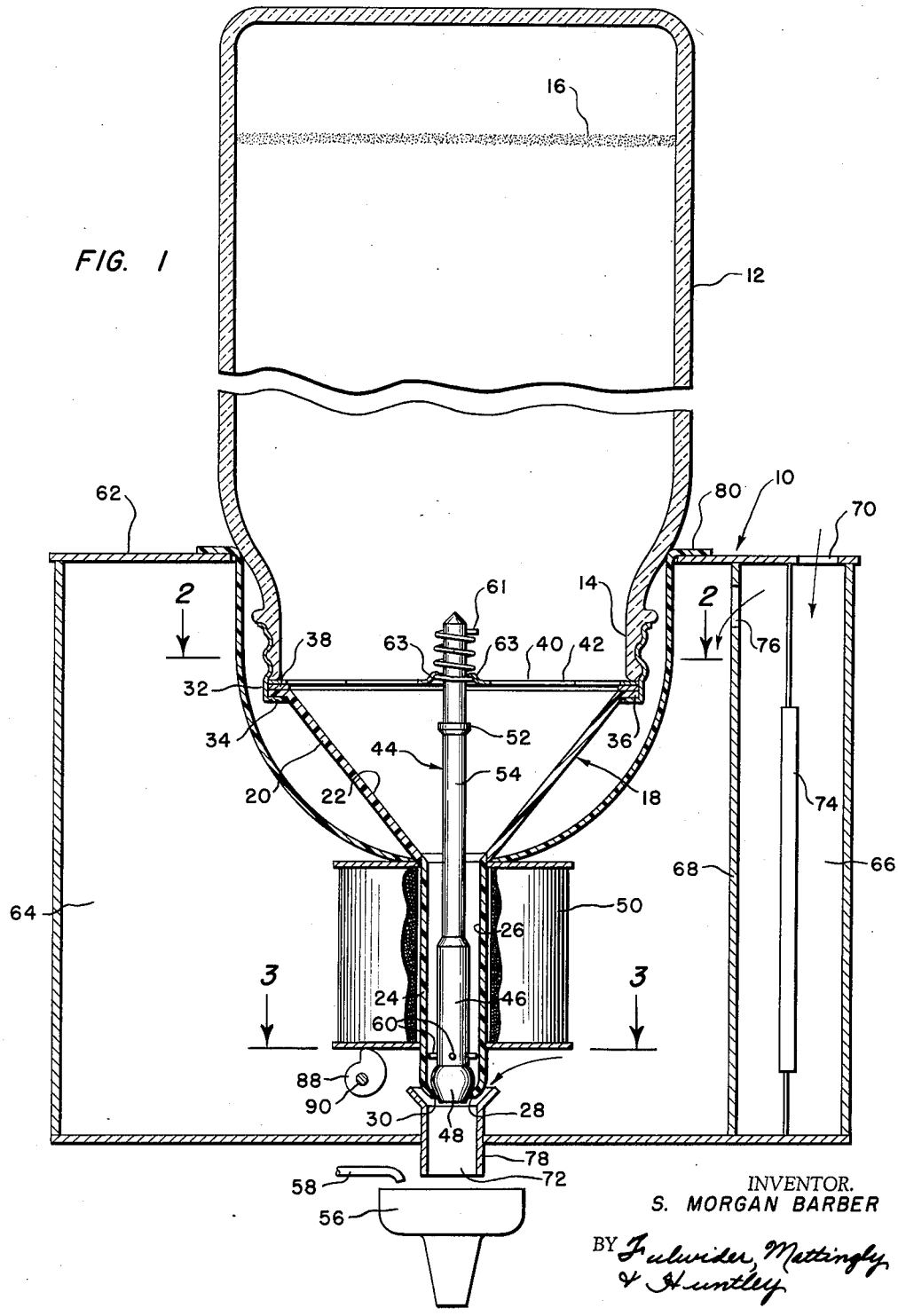
FIG. 1 is an elevational view of one embodiment of the present invention.

Referring now to the drawings, there is illustrated an embodiment of the present material dispensing apparatus, generally designated 10, which is shown in operative association with a standard jar or container 12. Container 12 includes an opening or mouth 14 which is threaded about its periphery, and this threaded end portion is adapted to be quickly and removably secured to apparatus 10. Commonly, such containers 12 for powdered tea and powdered coffee are usually of a standard size on the market today, and therefore the present apparatus 10 is particularly well suited to mount such containers 12 quickly and easily, and use containers 12 as the reservoir from which material 16 therein may be dispensed. This is an important feature of the present invention since use of the shipping container for material 16 as a reservoir eliminates the necessity for cleaning and washing any permanent reservoir carried in the dispensing apparatus. In addition, the transparent nature of the usual container 12 permits the user or operator of apparatus 10 to immediately ascertain the remaining amount of material 16 in container 12.

Apparatus 10 comprises a material receiver 18 which includes a downwardly sloping or tapering circumferential side wall 20, whose interior defines a downwardly tapering chamber 22 for directing material downwardly. A tubular extension or conduit 24 forms an integral extension of the side wall 20, and its interior defines a discharge passage 26 in communication with chamber 22, and material passing from chamber 22 is accepted within passage 26.

Material receiver 18 may be made of metal such as aluminum, but preferably is made of plastic material such as nylon or polyethylene, the low coefficient of friction of such plastics serving to facilitate the passage of material 16 thereover.

Figure 2:
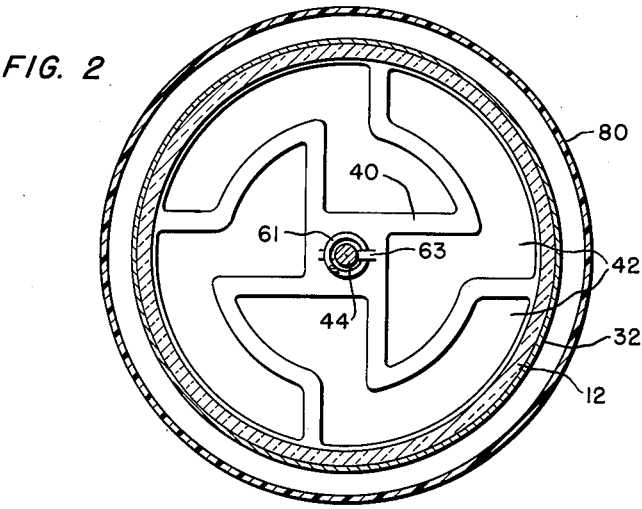
FIG. 2 is a view taken along line 2—2 of FIG. 1.
Figure 3:
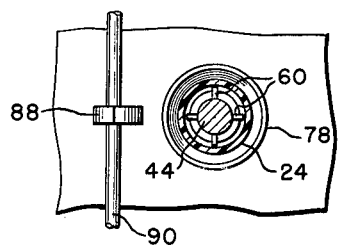
FIG. 3 is a view taken along line 3—3 of FIG. 1.

In the embodiment illustrated in FIGS. 1 and 2, the lower end of conduit 24 terminates in a discharge opening 28, formed by a valve seat 30 at the lower end of conduit 24. Valve seat 30 preferably is integral with conduit 24, being formed by pinching in or deforming the lower end of conduit 24 to form an outlet opening 28 having a diameter less than the diameter of discharge passage 26.

A securing means or cap 32 is threadably secured to the threaded neck or mouth 14 of container 12, and includes a flange 34 which bears against the under side of a flange 36 of receiver 18. In addition, a sealing gasket 38, and spring-like or resilient member or flexible diaphragm 40 are disposed between the lower edge of mouth 14 and the upper surface of flange 36, whereby receiver 18, gasket 38, and diaphragm 40 are firmly secured in position beneath mouth 14 by tightening of cap 32.

Diaphragm 40, which is made of a flexible, resilient, or springy material such as thin brass sheet metal, includes a plurality of openings to permit material to fall therethrough when a fresh container of material is mounted in position upon the receiver 18. Preferably, the openings 42 have a total area which is in excess of fifty percent of the area of diaphragm 40.

It is important to note that container 12 and material receiver 18 constitute a single assembly which is independent of the relatively stationary portions of apparatus 10 so that, when it is necessary to replenish material 16, container 12 and the associated material receiver 18 may be removed readily and a fresh container 12 substituted. That is, the body of container 12 may be grasped, and inverted so that its mouth 14 is upwardly disposed, and cap 32 thereafter removed. Cap 32 is then threaded onto a fresh container 12 and the fresh container 12 is inverted and disposed for use in the position illustrated in FIG. 1.

A modulating element and valve 44 is mounted for reciprocable vertical movement for controlling the flow of material through the discharge passage 26, and, in the embodiment shown in FIGS. 1 and 2, it includes a cylindrical lower portion 46 which terminates in an increased diameter portion 48. Portion 48 in its position of rest against valve seat 30 seals or closes off opening 28. Valve 44 is preferably made of non-ferrous material except for lower portion 46, which is made of a ferrous alloy, and therefore functions as a solenoid core.

A vibrator mechanism includes core 46 and solenoid coil 50. Coil 50 is supported in any suitable manner in surrounding relationship with conduit 24. Such solenoid coil is operable by either alternating or direct current, it being important to note that the solenoid action serves to move lower portion 46, and consequently valve 44, upwardly to unseat portion 48 from valve seat 30. Therefore, valve 44 is biased downwardly, and the consequent displacement of portion 46 out of the center of the field of coil 50 is followed by the action of coil 50 to move portion 46 upwardly again. The bias action, followed by the restoring action of coil 50 is very rapid so that portion 46 vibrates within the field of coil 50. During this period of vibration, valve 44 is spaced a short distance above valve seat 30 so that material 16 is dispensed out of opening 28. Thus, when solenoid 50 is energized, portion 46 is moved upwardly, and vibrates within the field of coil 50 in a position or positions which leave opening 28 open and unobstructed during the vibrating action of portion 46.

Upon energization of coil 50, valve 44 is caused to move upwardly as stated, and the bias force downwardly is provided by a shoulder or stop 52 carried on valve stem 54 of valve 44. Stop 52 is caused to strike and upwardly deflect diaphragm 40 when valve 44 moves upwardly, and the resilience of diaphragm 40 then provides a restoring or bias force against stop 52 causing valve 44 to move downwardly. The resulting vibration or agitation of both valve 44 and diaphragm 40 causes material 16 to be loosened and agitated in the area immediately about diaphragm 40. Further, the vibration of valve 44 causes the controlled dispensing through the discharge passage 26 of a uniform quantity of the material 16 per unit time while coil 50 is energized.

Material 16 discharged from outlet 28 is deposited in a dish or collector 56, and is then washed or carried to a dispensing outlet by hot water provided by a water line 58.

A certain amount of agitating of the material 16 in discharge passage 26 is also afforded by a plurality of pins or elements 60 which project laterally from the periphery of portion 46, but pins 60 also serve to center valve 44 within discharge passage 26 by reason of the engagement of the walls of passage 26 by the ends of pins 60. The upper end of stem 54 is centralized by the resilient member or diaphragm 40 which therefore constitutes a spider or means for centering the stem in the assembly, the pins 60 as noted above also serving the function of a spider.

It is to be noted that the upper end of valve stem 54 is freely slidable within a central opening in diaphragm 40 whereby valve 44 freely slides by diaphragm 40 during its upward and downward movement, however, a bias member in the form of a tension spring 61 is secured at one end to valve stem 54, and secured at its other end beneath tabs 63 formed in the upper surface of diaphragm 40. With this arrangement spring 61 is normally stretched and exerts its bias to urge valve stem 54 downwardly, thereby yieldingly tending to maintain portion 48 seated against valve seat 30. This bias of spring 61 is easily overcome by solenoid 50 to raise valve 44, but the bias is strong enough to keep valve 44 closed when funnel 20, conduit 24, and container 12 are inverted during servicing of apparatus 10. That is, the bias is just large enough to overcome the gravity forces acting upon valve 44 during inversion thereof.

Means are provided to form a sealed manifold about outlet opening 28, and in the present embodiment this conveniently takes the form of an enclosure 62 which is divided into a main compartment 64 and an adjacent compartment 66, compartments 64 and 66 being separated by a wall 68. Enclosure 62 is completely closed except for an opening for container 12, a fresh air duct 70 opening to the outside, and an outlet opening 72 which is disposed immediately beneath outlet opening 28. A heating element 74, which may be any conventional electrical resistance heating element, for example, is suitably mounted within compartment 66, and is effective to heat fresh air coming in through an opening 76 to compartment 64, and thence flows outwardly about outlet opening 28 and out of opening 72. To facilitate the route of the warm air about outlet opening 28, an air directing means, taking the form of a wide mouthed cylindrical member 78, is suitably secured to the bottom wall of enclosure 62. Thus, warm, dry air is directed over the lower end of conduit 24 and about outlet opening 28 to thereby substantially eliminate undesirable clogging of material 16 at outlet 28.

Container 12 is conveniently carried through an opening in the upper wall of enclosure 62, as illustrated, and a gasket 80, which is disposed therebetween, effects a substantially fluid-tight relationship. Gasket 80 is preferably made of a plastic material, and is formed downwardly into adjacency with the upper surface of coil 50. With this arrangement, gasket 80 serves the additional function of containing any material 16 which may inadvertently drop through the opening through which container 12 is disposed. This makes cleaning apparatus 10 very simple, since gasket 80 may be easily removed and washed.

Figure 4:
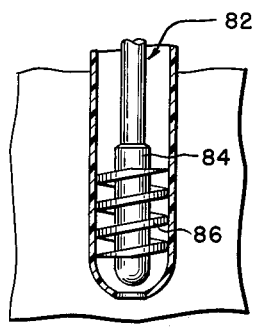
FIG. 4 is a detail view illustrating a modified form of reciprocating element.

Another form of reciprocating member 82 is illustrated in FIG. 4, and is substantially identical to reciprocating member or valve 44 except for modifications in the form of the lower portion thereof. Thus, instead of a lower portion 46, a portion 48, and pins 60, there is provided a lower portion 84 which is in the form of an auger, having a continuous spiral raised section 86. The lower end of portion 84 is adapted to seat against valve seat 30, and the spiral section 86, during vibration or reciprocation of portion 84 in the field of coil 50, serves to meter the flow of material along its lateral surfaces. The metering action evens out or modulates the flow of material through discharge passage 26 so that a substantially constant amount of material is dispensed during a predetermined period of time.

The stroke or length of reciprocal travel of member 44, or member 82, as the case may be, controls to a certain extent the material dispensed during any given period of time, and a control means such as a cam 88, FIG. 1, may be provided to vary the position of solenoid coil 50 upwardly or downwardly. This renders the action of solenoid coil 50 upon member 44 or member 82 either more or less effective to thereby vary the stroke of these members. Further, cam 88 may be adjusted to move solenoid coil 50 so far downwardly that solenoid coil 50 will be ineffective to raise member 44 or member 82. Thus, if container 12 contains sugar, for example, and the user of a coffee dispensing machine does not wish to use sugar in his coffee, he would rotate a knob (not shown) carried at the end of a shaft 90 which is rotatably disposed through the walls of enclosure 62. Such rotation will move solenoid 50 to a position in which it is ineffective to raise member 44 or member 82. This eliminates the need for a comparatively expensive switch for turning solenoid coil 50 on or off during each dispensing operation.

It is important to note that members 44 and 84 constitute a great deal more than a simple solenoid-actuated valve for opening and closing discharge opening 28. During their reciprocating motion in discharge passage 26, member 44 or 84, act as a modulant member. That is, they even out the flow of material, and provide a form of pumping action as they buffet the material proceeding downwardly. Their lateral surfaces meter the flow of material, and tend to provide a uniform rate of dispensing.

Figure 5:
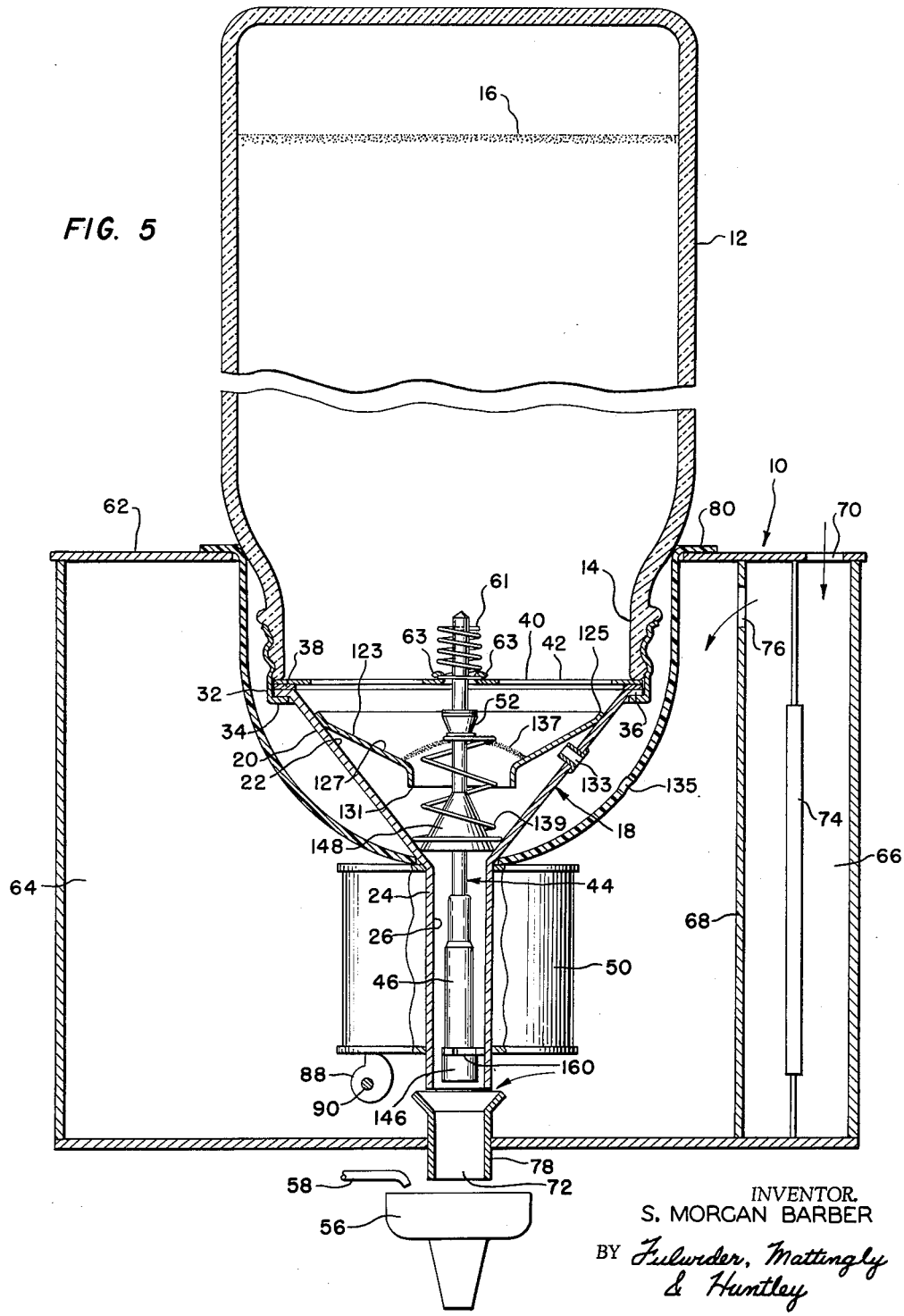
FIG. 5 is a view similar to FIG. 1, but showing another embodiment of the invention.

In the embodiment shown in FIG. 5, the modulating element and valve 44, like in FIGS. 1 and 2, is mounted for vertical reciprocation for controlling the flow of material through the discharge passage. The valve proper 148 is in the form of a cone, the periphery thereof forming a circular edge which is adapted to be seated upon the tapering wall 20. The solenoid core 146 is disposed at the bottom of the stem 154 of the valve. Three tines 160 are equally spaced about the stem, and function in the same manner as defined with respect to pins 60 in FIGS. 1 and 2. Vertical vibration of the valve 148 modulates the discharge of material from the receiver.

A circular funnel 123 is disposed within the receiver 18, the upper edge 125 thereof being in sealing relationship with the inner tapered wall 20 of the receiver. The side wall 127 of the funnel, angles inwardly relative to the side wall 20 of the receiver, so as to form an open bottom chamber 129 between said walls. The open bottom or outlet end 131 of the funnel 123 is aligned vertically with the discharge passage 24. Several tubes 133, for the ingress and egress of air, extend through the side wall 20 of the receiver 18, and these tubes terminate adjacent the top of the receiver 18. Air can be admitted to the space between the receiver 18 and gasket 80 in any suitable manner, one form including an opening 135 in the gasket.

By the use of the funnel 123, the head pressure of the material, on the valve 148, and the environment of the valve 148, is materially reduced. Some of the materials, to be dispensed, have the characteristic of clogging, resulting in a bridge of material 137 over the outlet 131 of the funnel 123. This bridge tends to support the material thereabove. Since air is admitted to the receiver 18, and since the bridge functions as above described, the head pressure of the material on and about the valve proper 148, is maintained substantially constant.

Under certain conditions with certain materials, it is desirable to provide for agitating the material at the bridge of the material 137 and therebelow. A light coil spring 139 can be employed for this purpose. This spring is interposed between the shoulder 52 on the valve stem and the bottom of the wall 20 of the receiver 18.

While certain preferred embodiments of the invention have been specifically disclosed, it is understood that the invention is not limited thereto, as many variations will be readily apparent to those skilled in the art, and the invention is to be given its broadest possible interpretation within the terms of the following claims.

I claim:

1. Material dispensing apparatus comprising material receiving means which includes a chamber terminating in an elongated discharge passage of uniform cross-sectional area substantially throughout its length, said discharge passage having an outlet opening; an element confined within and mounted for vibratory movement in said discharge passage; means for vibrating said element; and a resilient member disposed in the path of material passing through said chamber; means on said element and said resilient member coengageable during at least a portion of said vibratory movement to cause movement of said resilient member in said material and to bias said element downwardly, said element having an enlarged lower portion reciprocable within said discharge passage and valve means to control the flow of material through said discharge passage and said outlet opening.

2. Material dispensing apparatus comprising material receiving means which includes a chamber terminating in an elongated discharge passage of uniform cross-sectional area substantially throughout its length, said discharge passage having an outlet opening and forming a valve seat at the lower end thereof; means including an element confined within and mounted for vibratory movement in said discharge passage, said second mentioned means forming a valve cooperating with said seat for closing said opening; means for raising said second mentioned means to open said outlet opening and for causing vibratory movement to be imparted to said element while confined in said elongated passage with the valve constantly spaced from said valve seat; a resilient member disposed in the path of material passing through said chamber, said second mentioned means and said resilient member having means coengageable when said element is raised by said third mentioned means to bias said element downwardly, said third mentioned means being operative to urge said element upwardly each time said element is biased downwardly by said resilient member whereby said element reciprocates along a vertical path spaced above said outlet opening, said element having an enlarged lower portion reciprocable within said discharge passage.

3. Material dispensing apparatus comprising material receiving means formed to define a downwardly sloping chamber terminating in an elongated discharge passage having an outlet opening; means for separably securing said material receiving means to the mouth of a standard container for material; a flexible member horizontally disposed across said chamber in the path of the flow of material from said container to said chamber, said flexible member being centrally apertured and having a plurality of openings for the passage of material therethrough; an element mounted for reciprocable movement upwardly and downwardly in said discharge passage, said second mentioned element including a stem freely slidable through the aperture of said flexible member, said stem including means engageable with said flexible member during at least a portion of the upward movement of said second mentioned element, said flexible member being operative upon engagement with said stem to exert its bias to urge said element downwardly, said element including a ferrous portion; and a solenoid coil arranged adjacent said element and effective upon energization to attract said ferrous portion upwardly to move said element upwardly to open said outlet opening, the opposing actions of said solenoid coil and said flexible member thereafter tending to vibrate said element in an open position within said discharge passage.

4. Material dispensing means according to claim 3 and including means operative to adjust the position of said solenoid coil relative to said ferrous portion.

5. Material dispensing apparatus comprising material receiving means formed to define a downwardly sloping chamber terminating in an elongated discharge passage having an outlet opening; means for separably securing said material receiving means to the mouth of a standard container for material; a flexible member horizontally disposed across said chamber in the path of the flow of material from said container to said chamber, said member being centrally apertured and having a plurality of openings for the passage of material therethrough; an element mounted for reciprocable movement upwardly and downwardly in said discharge passage, said element including a stem freely slidable through the aperture of said memebr, said stem including means engageable with said member during at least a portion of the upward movement of said element, said member being operative upon engagement with said stem to exert its bias to urge said element downwardly, said element including a ferrous portion; a bias means coupled to said stem and said member and effective to bias said stem downwardly to thereby tend to move said element into position to close said outlet opening; and a solenoid coil arranged adjacent said element and effective upon energization to attract said ferrous portion upwardly, and overcoming the bias of said bias means to move said element upwardly to open said outlet opening, the opposing actions of said solenoid coil and said member thereafter tending to vibrate said element in an open position within said discharge passage.

6. A material dispensing apparatus, comprising in combination, means forming a receiving chamber adapted to be connected at the upper end thereof with a container of material; means forming a discharge passage for the bottom of the chamber, said discharge passage having an opening in the bottom; a valve seat circumscribing said opening, said discharge passage having a downwardly extending section of uniform cross-sectional area throughout the length thereof; material flow control means including a solenoid core within said discharge passage, said material flow control means forming a valve cooperating with said seat for closing said opening and forming a portion defining with said means defining said discharge passage an annular flow path through said discharge passage, means supporting said material flow control means for vibratory movement with said portion confined within the upper and lower limits of said section of uniform cross-sectional area; and means, including a solenoid coil surrounding said discharge passage, for raising said valve above the seat and for imparting vibratory movement to said portion of said element while said latter portion is confined in said section of the discharge passage and while said valve is constantly spaced above said valve seat.

7. A dispensing apparatus as defined in claim 6, wherein said means supporting said element for vibratory movement includes a resilient member disposed at the top of the receiving chamber in the path of said material, said resilient member having an opening for the passage of said material therethrough, said resilient member being connected with and moved by said third mentioned means.

8. A dispensing apparatus as defined in claim 6, including means for raising and lowering said coil.

9. Material dispensing apparatus comprising:
(A) means forming material receiver;
(B) means forming an elongated vertically extending portion through which the material is dispensed from said receiver;
(C) a resilient member at the top of the receiver disposed in the path of material and having
   (a) an opening for the passage therethrough of the material to be dispensed; and having
   (b) a second opening;
(D) a valve for controlling the flow of material through said elongated portion;
   (c) said valve having a valve stem formed integrally therewith and extending upwardly and freely through the second mentioned opening in the resilient member;
(E) a spring connected with the stem and with the resilient member;
(F) a solenoid core within the elongated portion operatively connected with said valve;
(G) and a solenoid coil surrounding said elongated portion.

10. Material dispensing apparatus comprising:
(A) means forming a material receiving chamber having
   (a) an open top for receiving material to be dispensed;
   (b) and an outlet at the bottom thereof;
(B) a spider at the top of the chamber disposed in the path of material and having
   (c) an opening for the passage of material therethrough and having
   (d) a second opening;
(C) means forming a valve for controlling the flow of material through said chamber outlet;
   (e) said last mentioned means including a valve stem formed integrally with the valve and extending upwardly and freely through the second mentioned opening in the spider;
   (f) said last mentioned means including an integral ferrous portion;
(D) a spring connected with the stem and with the spider;
(E) and a solenoid coil surrounding said ferrous portion of the last mentioned means.

11. Material dispensing apparatus comprising:
(A) means forming a material receiving chamber;
   (a) said chamber being open at the top for receiving material to be dispensed;
   (b) and having an opening at the bottom for the discharge of material therefrom;
(B) an element carried by said chamber forming means and having means to secure said chamber forming means to the mouth of an inverted standard container for material;
(C) a flexible spider horizontally disposed upon said chamber forming means in the path of the flow of material from said container to said chamber;
   (c) said spider being centrally apertured and having a plurality of openings therethrough;
(D) a second element mounted for vertical reciprocating movement in said chamber and including a valve for opening and closing the opening in the bottom of the chamber;
   (d) said latter element including a stem freely slidable through the aperture of said spider;
   (e) said stem including means engagable with the spider during at least a portion of the upward movement of said latter element, said spider being operative upon engagement by said stem to exert its bias to urge said element downwardly; and means for imparting intermittent upward movement to said latter element.

12. Material dispensing means as defined in claim 11, including a spring connected with said stem and spider for normally closing said valve.

13. Material dispensing apparatus comprising material receiving means which includes a chamber terminating in an elongated discharge passage of substantially uniform cross-sectional area substantially throughout its length, said discharge passage having an opening; an element, including a solenoid core, within and mounted for vibratory movement in said discharge passage; a solenoid coil surrounding the passage for vibrating said element; and a resilient member disposed adjacent said material receiving means in the path of material; said element and said resilient member having means coengageable during at least a portion of said vibratory movement to bias said element downwardly, said resilient member having at least one opening for the passage of said material therethrough being located to normally act upon the material to be dispensed, said element including a valve for controlling the flow of material through said discharge passage.

14. Material dispensing apparatus comprising material receiving means which includes a chamber terminating in an elongated discharge passage of uniform cross-sectional area substantially throughout its length, said discharge passage having an opening and forming a valve seat means including a solenoid core within and mounted for vibratory movement in said discharge passage, said second mentioned means forming a valve cooperating with said seat for closing said opening; a solenoid coil for raising said second mentioned means to open said outlet opening and for causing vibratory movement to be imparted to said element while in said elongated passage with the valve constantly spaced from said valve seat; a resilient spider disposed adjacent said material receiving means in the path of material; said second mentioned means and said spider having means coengageable when said element is raised by said coil and effective to bias said element downwardly, said coil being operative to urge said element upwardly each time said element is biased downwardly by said resilient spider whereby said element reciprocates along a vertical path.

15. Material dispensing apparatus comprising material receiving means formed to define a downwardly sloping chamber terminating in an elongated discharge passage, said material receiving means having means for separably securing said material receiving means to the mouth of a standard container for material; a flexible member horizontally disposed upon said material receiving means and across said chamber in the path of the flow of material from said container to said chamber, said member being centrally apertured and having a plurality of openings therethrough; a second element mounted for reciprocable movement upwardly and downwardly in said discharge passage and including a valve for opening and closing said passage, said second mentioned element including a stem freely slidable through the aperture of said member, said stem including means engageable with said member during at least a portion of the upward movement of said second mentioned element, said member being operative upon engagement with said stem to exert its bias to urge said element downwardly, said second mentioned element including a ferrous portion; and a solenoid coil arranged adjacent said element and effective upon energization to attract said ferrous portion upwardly to move said element upwardly to open said outlet opening, the opposing actions of said solenoid coil and said member thereafter tending to vibrate said element while said valve is in an open position.

16. Material dispensing means according to claim 15, and including means operative to adjust the position of said solenoid coil relative to said ferrous portion.

17. Material dispensing apparatus comprising material receiving means formed to define a downwardly sloping chamber terminating in an elongated discharge passage, said material receiving means having means for separably securing said material receiving means to the mouth of a standard container for material; a flexible member horizontally disposed upon said material receiving means and across said chamber in the path of the flow of material from said container to said chamber, said member being centrally apertured and having a plurality of openings therethrough; an element mounted for reciprocable movement upwardly and downwardly in said discharge passage, and including a valve for passage and closing said opening, said element including a stem freely slidably through the aperture of said member, said stem including means engageable with said member during at least a portion of the upward movement of said element, said member being operative upon engagement with said stem to exert its bias to urge said element downwardly, said element including a ferrous portion; a bias means coupled to said stem and said member and effective to bias said stem downwardly to thereby tend to move said element into position to close said passage; and a solenoid coil arranged adjacent said element and effective upon energization to attract said ferrous portion upwardly, and overcoming the bias of said bias means to move said element upwardly to open said passage, the opposing actions of said solenoid coil and said member thereafter tending to vibrate said element while said valve is in an open position.

18. Material dispensing apparatus comprising:
 (A) Means forming a vertically extending material receiver;
   (a) said receiver having a circumferential side wall;
   (b) said receiver being open at the top for receiving material dispensed;
   (c) said receiver having a bottom opening, said bottom opening being smaller in area than the opening in the top of the receiver;
 (B) valve means operable for controlling the flow of material through the bottom opening and including means for opening and closing said valve means;
 (C) a funnel within the receiver;
   (d) the top of the funnel being in sealing relationship with the side wall of the receiver;
   (e) said funnel having an outlet above the bottom opening in the receiver, spaced from the side wall of the receiver;
   (f) said receiver having an opening in the side wall at a higher level than the outlet of the funnel for the ingress air to the space between the funnel and inner side of the side wall of the receiver;
 (D) and an open bottom container connected with the upper end of the receiver.

19. Material dispensing apparatus as defined in claim 18, characterized in that the circumferential side wall of the receiver tapers downwardly inwardly, and that the outlet of the funnel substantially aligns with the inlet of the bottom opening in the receiver.

20. Material dispensing apparatus comprising: material receiving means formed to define a downwardly sloping chamber terminating in an elongated discharge passage; means for separably securing said material receiving means to the mouth of a standard container of material; a flexible member disposed across said chamber in the path of material passing from said container into said chamber; said flexible member being centrally apertured and having an opening for the passage of material therethrough, an element reciprocal in said discharge passage; said element having a stem slidable in said aperture of said flexible member; said stem having means engageable with said flexible member during a portion of the movement of said element in one direction; said flexible member being operative upon engagement with said means on said stem to bias said element in the other direction; said element having a ferrous portion; a solenoid coil arranged adjacent said element and effective upon energization to cause movement of said element in said one direction, the opposing actions of said solenoid coil and said flexible member thereafter tending to vibrate said element within said discharge passage; and valve means normally closing said discharge passage and openable upon movement of said element in said one direction, said valve means remaining open during vibration of said element in said discharge passage.

21. Material dispensing apparatus as defined in claim 20 including means coengaged with said stem and with said flexible member to normally bias said element in said other direction to close said valve means.

22. A material dispensing apparatus, comprising: a body open at its opposite ends and having means at one end for securing the same to a container of material to be dispensed; said body having a flow passage therethrough, an elongated member reciprocable in said passage; said member having a valve head thereon and said body having a valve seat circumscribing said passage; flexure means at said one end of said body and disposed across said passage for centralizing said member in said passage; said centralizing means being means for allowing the passage of material therethrough; resilient means engaged with said member for normally biasing said member in a direction to cause said valve to engage said seat; actuator means for moving said member in the other direction; and said member and said centralizing means having coengageable means for causing flexure of said centralizing means upon movement of said member in one direction.

References Cited by the Examiner
UNITED STATES PATENTS

| | | | |
|---|---|---|---|
| 1,354,626 | 10/20 | Service | 222—230 X |
| 2,123,318 | 7/38 | Taylor | 222—201 |
| 2,325,970 | 8/43 | Myers | 222—246 X |
| 2,435,758 | 2/48 | Snyder | 222—504 X |
| 2,446,967 | 8/48 | Sykes | 222—203 |
| 2,526,735 | 10/50 | Duce | 222—196 |
| 2,830,743 | 4/58 | Rimsha et al. | 222—504 X |
| 2,831,609 | 4/58 | Montbriand et al. | 222—76 |
| 2,887,255 | 5/59 | Bauerlein | 222—504 X |

LOUIS J. DEMBO, *Primary Examiner.*

LAVERNE D. GEIGER, *Examiner.*

UNITED STATES PATENT OFFICE
CERTIFICATE OF CORRECTION

Patent No. 3,204,832

September 7, 1965

S. Morgan Barber

It is hereby certified that error appears in the above numbered patent requiring correction and that the said Letters Patent should read as corrected below.

Column 11, line 10, for "passage", second occurrence, read -- opening --; line 11, for "opening" read -- passage --.

Signed and sealed this 19th day of July 1966.

(SEAL)
Attest:

ERNEST W. SWIDER
Attesting Officer

EDWARD J. BRENNER
Commissioner of Patents